United States Patent
Vom Stein

(10) Patent No.: US 8,360,534 B2
(45) Date of Patent: Jan. 29, 2013

(54) SEALING ASSEMBLY AND HINGE OF TRACK HAVING THE SEALING ASSEMBLY

(75) Inventor: Hans-Joachim Vom Stein, Odenthal (DE)

(73) Assignee: Aktiebolaget SKF, Göteborg (SE)

( * ) Notice: Subject to any disclaimer, the term of this patent is extended or adjusted under 35 U.S.C. 154(b) by 427 days.

(21) Appl. No.: 12/312,108

(22) PCT Filed: Oct. 16, 2007

(86) PCT No.: PCT/EP2007/008939
§ 371 (c)(1),
(2), (4) Date: Feb. 16, 2010

(87) PCT Pub. No.: WO2008/049529
PCT Pub. Date: May 2, 2008

(65) Prior Publication Data
US 2010/0148572 A1 Jun. 17, 2010

(30) Foreign Application Priority Data
Oct. 26, 2006 (DE) .......................... 10 2006 050 439

(51) Int. Cl.
*B62D 55/15* (2006.01)
*F16J 15/16* (2006.01)

(52) U.S. Cl. ........................................ 305/103; 305/106
(58) Field of Classification Search .................. 305/100, 305/102, 103, 104, 105, 106, 202, 203; 277/384, 277/573, 549, 381, 372, 373, 380, 402, 445, 277/446
See application file for complete search history.

(56) References Cited

U.S. PATENT DOCUMENTS

| | | | | |
|---|---|---|---|---|
| 2,463,695 A | * | 3/1949 | Jensen | 277/392 |
| 4,094,516 A | * | 6/1978 | Morley et al. | 305/103 |
| 4,132,418 A | * | 1/1979 | Roli | 277/382 |
| 4,195,852 A | * | 4/1980 | Roley et al. | 277/380 |
| 4,262,914 A | * | 4/1981 | Roley | 277/381 |
| 4,331,339 A | * | 5/1982 | Reinsma | 305/103 |
| 4,457,521 A | * | 7/1984 | Morley | 305/103 |
| 4,607,854 A | * | 8/1986 | Bissi et al. | 277/402 |
| 5,390,997 A | * | 2/1995 | Nakaishi et al. | 305/103 |
| 5,763,956 A | * | 6/1998 | Metz et al. | 305/102 |

FOREIGN PATENT DOCUMENTS

| | | |
|---|---|---|
| DE | 2726033 A1 | 12/1977 |
| DE | 3207327 A1 | 9/1983 |
| DE | 19708630 A1 | 9/1998 |
| DE | 10230561 A1 | 1/2004 |
| DE | 102004031941 A1 | 1/2006 |
| EP | 0735299 A | 10/1996 |
| EP | 1378675 A2 | 1/2004 |
| GB | 1576029 A | 10/1980 |
| WO | WO9811367 A1 | 3/1998 |
| WO | WO2010037544 A1 | 4/2010 |

* cited by examiner

*Primary Examiner* — Kip T Kotter
(74) *Attorney, Agent, or Firm* — Mark A. Ussai; Bryan Peckjian

(57) ABSTRACT

A sealing assembly for sealing a lubrication chamber defined at least in part by two pivotable track link portions is provided. The sealing assembly includes a sealing ring having an annular sealing edge sealingly abutting on an end surface of one of the portions and an elastic ring permanently abutting on the other of the portions and applying pressure to the sealing ring, the elastic ring having an axially-projecting, hollow cylinder-like sealing lip, which radially encloses the sealing ring in the region of a sealing edge and sealingly abuts on the end surface when two track link portions axially shift towards each other. A support ring is disposed between the sealing ring and the elastic ring.

14 Claims, 1 Drawing Sheet

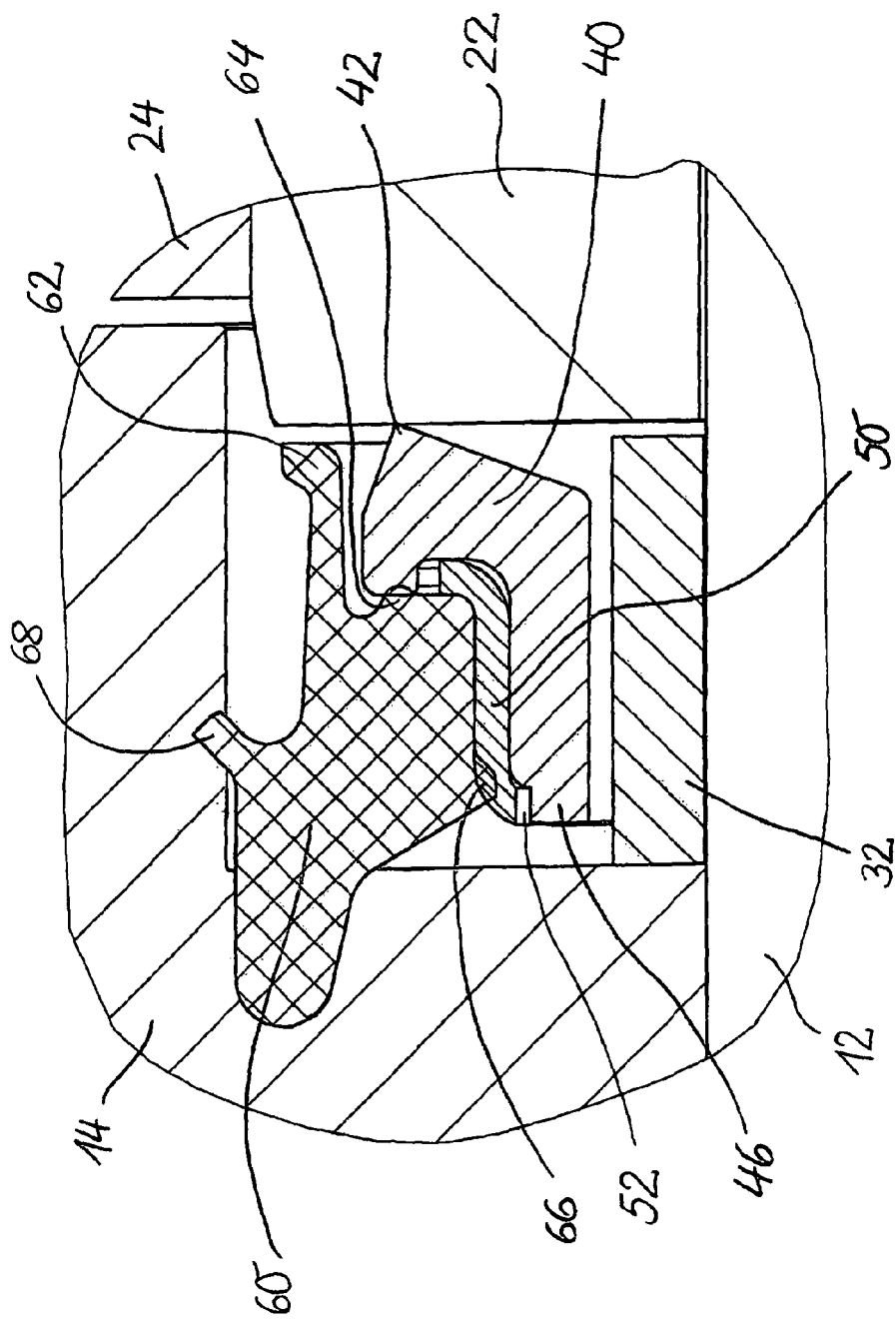

SEALING ASSEMBLY AND HINGE OF TRACK HAVING THE SEALING ASSEMBLY

CROSS-REFERENCE

This application is the U.S. national stage filing of International Application No. PCT/EP2007/008939 filed Oct. 16, 2007, which claims priority to German patent application no. 10 2005 050 439.9 filed Oct. 26, 2006.

TECHNICAL FIELD

RELATED ART

The invention relates to a sealing assembly for sealing between a first portion of a track and a second portion of the track, which is at least pivotable relative to the first, and a hinge of a track having the sealing assembly.

In tracks, in particular of tracked vehicles, the links of the track are typically connected with each other via pivot pin hinges. For this purpose, such a pivot pin hinge comprises a pin and a bushing that is rotatably suspended over the pin, wherein links of the track are press-fit on the respective ends of the pin and the bushing. The pivot bearing surfaces between the pin and the bushing are lubricated by an oil reservoir in the pin, wherein the oil chamber between the pin and the bushing is sealed by two sealing elements that comprise sealing lips pressing against the end faces of the bushing.

A track pin assembly having a seal is known, for example, from DE 27 26 033 A1, wherein the track pin assembly comprises a track pin with a portion of a first track link attached to the track pin and a bushing with a portion of a second track link attached to the bushing, which bushing surrounds a portion of the track pin and is movable back and forth relative to the track pin. Further, the track pin assembly comprises a cavity disposed in the first track link for receiving the seal, which is provided with a sealing lip for abutment on an end face of the bushing, and a spacer ring, which surrounds the track pin and extends in the axial direction between an end face of the cavity and the end face of the bushing; the cavity forms a hollow space for receiving the seal. The seal inserted in the hollow space comprises a primary seal ring made of a relatively stiff, but elastic, first elastomeric material and a secondary sealing element made of a second resilient elastomeric material that is substantially less stiff than the first material.

A sealing assembly for a track pivot pin hinge is known from U.S. Pat. No. 4,607,854, in which a first ring made of a flexible elastomeric material having a bushing-like portion and a flange-line portion with a sealing lip and a second ring made of elastic material contacting the first for sealing a space between a pin and a bushing surrounding the pin are provided. The first ring comprises a cylindrical, metallic stiffening ring that is completely embedded in the bushing-like portion of the first ring.

SUMMARY

An object of the invention is to provide a sealing assembly for sealing between a first portion of a track and a second portion of the track that is at least pivotable relative to the first, which sealing assembly has a particularly long service life.

According to one aspect of the present teachings, a sealing assembly for sealing a lubrication chamber defined between a first portion of a track and a second portion of the track that is at least pivotable relative to the first portion preferably comprises the following features:

a sealing ring having an annular-shaped sealing edge configured to sealingly abut on an end surface of one of the first and second portions, an elastic ring permanently abutting on the other of the first and second portions and configured to apply pressure to the sealing ring, the elastic ring having an axially-projecting, hollow cylinder-like sealing lip, which radially encloses the sealing ring in the region of the sealing edge and, in certain applications or modes of operation, also sealingly abuts on the end surface, and a support ring disposed between the sealing ring and the elastic ring.

The invention is thus based upon the knowledge that, in a conventional sealing assembly wherein the elastic ring interacts directly with the sealing ring, the elastic ring is intentionally deformed when installed, such that it generates forces in the axial as well as the radial direction, wherein the radially-acting forces cause, after a certain amount of time, the cylinder shell-like opposing surface of the sealing ring to be pressed against the pin or spacing ring due to creeping effects, so that the sealing assembly becomes immovable and no longer suffices to compensate axial tolerances, which eventually causes leakages. A further effect contributing thereto is the deformation of the sealing ring that occurs when the pin and/or the spacer ring axially moves due to the radially-acting forces in combination with the friction of the sealing ring on the pin and/or sealing ring. The above-mentioned disadvantageous effects are avoided by the invention by inserting a support ring between the sealing ring and the elastic ring; the large radial forces are absorbed by the support ring. Due to the axially-projecting, hollow cylinder-like sealing lip, which also sealingly abuts, in a manner of speaking, outside of the sealing edge of the sealing ring on the opposing surface in intended constructions of the sealing assembly, a supplemental protection is provided for the sealing edge of the sealing ring with particular advantages, which has, among other things, a positive influence on the service life of the sealing edge.

By simply inserting the support ring between the sealing ring and the elastic ring during the assembly, the entire sealing assembly is manufacturable in a simple and cost-effective manner. Using the inventive sealing assembly, a significantly longer service life is achieved relative to comparable conventional sealing assemblies having substantially the same or even lower manufacturing costs.

In an advantageous design, the support ring, the elastic ring and the sealing ring are designed in a manner coordinated to each other, such that the elastic ring, together with the sealing ring, seals the support ring on the outside thereof. Penetration of moisture from the outside to the support ring is thereby advantageously inhibited, so that the support ring, in particular in the embodiment of a metal ring, is protected against corrosion. In addition, in a further advantageous design, the support ring is constructed so as to extend less far towards the outside in the radial direction than the sealing ring and the elastic ring for axially overlapping the support ring is constructed with an axially-projecting, annular bulge provided for abutting on a side of the sealing ring that opposes the sealing edge side.

In an advantageous design, the inner surface side of the elastic ring at its axial end opposite of the opposing surface is formed with an annular-extending bulge. This should advantageously and reliably prevent an incorrect installation of the elastic ring rotated by 180°. At the same time, said bulge constitutes a supplemental sealing between the elastic ring and the support ring.

In an advantageous design, the outer surface side of the elastic ring is formed with an annular-extending bulge projecting outwardly and obliquely to the opposing surface. According to a suitable application of the elastic ring, this should advantageously prevent the elastic ring from falling out again during its installation.

In a further advantageous design, the sealing ring and the support ring are constructed so as to be prevented from rotating relative to each other. The above-described advantages described are thereby further augmented. In one preferred embodiment, the sealing ring is prevented from rotating relative to the support ring by forming axially-extending projections distributed in the circumferential direction on the portion of the outer surface of the sealing ring that abuts the support ring. In addition or in the alternative, the sealing ring is prevented from rotating relative to the support ring by forming at least one sector-like notch on the axial end of the support ring that faces away from the opposing surface in a radially-inward proceeding region from the inner edge radially outward. The sealing ring is formed with a corresponding, axially-projecting, sector-like projection for an appropriate engagement in the notch. Naturally, a plurality of corresponding notches and projections can also be provided in a distributed manner in the circumferential direction of the support ring and sealing ring, respectively.

Further advantages, features and details of the invention are derivable from the following described exemplary embodiments of the invention with the assistance of the FIGURE.

BRIEF DESCRIPTION OF THE DRAWING

The sole FIGURE shows a longitudinal section through a representative sealing assembly for sealing a lubrication chamber between a first portion of a track and a second portion of the track that is at least pivotable relative to the first portion. The FIGURE merely shows an upper, leftmost region of the longitudinal section in a cut-out manner, wherein the not-illustrated, right region is preferably designed as a mirror image of the illustrated region with reference to a vertical axis.

DETAILED DESCRIPTION OF THE INVENTION

The first portion of the track thus comprises a pin 12 and an outer track link 14, which is press-fit onto the pin 12 with one of its cylindrical bores. The second portion of the track comprises a bushing 22, which is at least pivotable around the pin 12 and is suspended over the pin 12 with a radial clearance, and an inner track link 24 that is press-fit onto the bushing 22 with its cylindrical bore. Further, a spacer ring 32 suspended over the pin 12 is disposed with an axial clearance between the outer track link 14 and the bushing 22 and with a radial clearance.

A sealing ring 40 is slid over the spacer ring 32; the sealing ring 40 has a sealing edge 42 configured for sealing the space filled with oil that at least partially extends between the outer surface of the pin 12 and the inner surface of the bushing 22; the sealing edge 42 sealingly abuts on the end face of the bushing 22. Furthermore, the inner surface of the sealing ring 40 extensively abuts on the outer surface of the spacer ring 32 and has a substantially L-shaped cross-sectional design.

In the direction towards the outer track link 14, a support ring 50, e.g., made of metal, is disposed adjacent to the sealing ring 40; the support ring 50 has a substantially S-shaped cross-sectional design. Finally, an elastic ring 60 is disposed adjacent to the support ring 50.

The sealing ring 40 comprises an elastomeric material, in particular polyurethane, and can be formed in a fiber-reinforced manner. The elastic ring 60 likewise comprises an elastomeric material, in particular rubber, and is less stiff than the sealing ring 40. The support ring 50 is significantly stiffer than the sealing ring 40 and the elastic ring 60.

The sealing ring 40 and the support ring 50 are constructed so as to be prevented from rotating relative to each other. The prevention from relative rotation is effected by forming an outer surface of the sealing ring 40, which is provided for abutting on the support ring 50, with axially-extending projections distributed in the circumferential direction and by forming the left axial end of the support ring 50, in a radially-inward proceeding region from the inner edge radially outward, with three sector-like notches 52 spaced from one another in the circumferential direction, in which the sealing ring 40 is formed with corresponding axially-projecting, sector-like bulges 46 for a corresponding engagement.

The two above-described measures for preventing relative rotation, i.e. the axially-extending projections on the outer surface of the sealing ring 40 and the interleaved engagement of the sealing ring 40 and the support ring 50, are, in a manner of speaking, redundant measures, so that only one of the measures is also sufficient in other embodiments.

In order to suppress corrosion of the metallic support ring 50 caused by moisture penetrating inward from the outside, the support ring 50, the elastic ring 60 and the sealing ring 40 are designed in a manner coordinated to each other such that the right end of the support ring 50 extends less far radially outward than the sealing ring 40 and the elastic ring 60. The elastic ring 60 has an axially-extending, annular protrusion 64 that is provided for sealingly abutting on an end surface of the sealing ring 40 that is opposite of the sealing edge 42, in order to seal the support ring 50 against influences from the outside.

The sealing ring 40 and the support ring 50 are constructed so as to be prevented from rotating relative to each other. The prevention from relative rotation is effected by forming an outer surface of the sealing ring 40, which is provided for abutting on the support ring 50, with axially-extending projections distributed in the circumferential direction and by forming the left axial end of the support ring 50, in a radially-inward proceeding region from the inner edge radially outward, with three sector-like notches 52 spaced from one another in the circumferential direction, in which the sealing ring 40 is formed with corresponding axially-projecting, sector-like bulges 46 for a corresponding engagement.

The two above-described measures for preventing relative rotation, i.e. the axially-extending projections on the outer surface of the sealing ring 40 and the interleaved engagement of the sealing ring 40 and the support ring 50, are, in a manner of speaking, redundant measures, so that only one of the measures is also sufficient in other embodiments.

In the Figure, the first and second portions of the track and the spacer ring 32 are illustrated in the manner assembled as intended, whereas the elastic ring 60 and the sealing ring 40, in particular, are illustrated in a still-undeformed state that exists before the two portions of the track are pushed together. When the two portions of the track are assembled as intended as illustrated in the Figure, then the elastic ring 60 is highly deformed, whereby the elastic ring 60 sealingly abuts on the outer track link 14; at the same time, the inner surface of the elastic ring 60 presses the sealing ring 40 via the support ring 50 on the outer surface off the spacer ring 32 and the sealing edge 42 presses against the end face of the bushing 22. Further, the sealing lip 62 of the elastic ring 60 is thereby pressed against the end face of the bushing 22 and the projection 64 of the elastic ring 60 is pressed against the sealing ring 40.

Reference Number List

12 Pin
14 Outer track link
22 Bushing
24 Inner track link
32 Spacer ring
40 Sealing ring
42 Sealing edge
46 Sector-like bulge
50 Support ring
52 Sector-like notch
60 Elastic ring
62 Sealing lip
64 Projection
66, 68 Bulge

The invention claimed is:

1. A sealing assembly for sealing a lubrication chamber at least partially defined by a first portion of a track and a second portion of the track, the second portion being at least pivotable relative to the first portion, the sealing assembly comprising:
   a sealing ring having an annular sealing edge configured to sealingly abut on an end surface of the first portion,
   an elastic ring configured to abut on the second portion and to urge the sealing ring in an axial direction towards the first portion, the elastic ring having an axially-projecting, hollow cylinder-shaped sealing lip that projects towards the second portion, and
   a support ring disposed between the sealing ring and the elastic ring, and
   wherein the sealing ring and the support ring are configured so as to be prevented from rotating relative to each other, and
   wherein at least one axially-extending outer surface of the sealing ring engages the support ring to create a first engagement, and
   wherein at least one notch defined in a radially-inwardly extending region of an axial end of the support ring that faces away from the end surface of the first portion and the sealing ring has at least one corresponding axially-projecting, sector-like bulge configured to engage in the notch of the support ring to create a second engagement, and
   wherein rotation of the support ring relative to the sealing ring is prevented by the combination of both the first and second engagements.

2. A sealing assembly according to claim 1, wherein the sealing ring has a substantially L-shaped longitudinal cross-section and the support ring has a substantially S-shaped longitudinal cross-section.

3. A sealing assembly according to claim 1, wherein a first annular bulge is defined on a surface of the elastic ring that contacts the sealing ring, the first annular bulge being configured to inhibit moisture from penetrating into the support ring disposed between the elastic ring and the sealing ring.

4. A sealing assembly according to claim 1, wherein a second annular bulge projects radially outward from a radially outer surface of the elastic ring, the second annular bulge also projecting obliquely towards the end surface of the first portion.

5. A sealing assembly according to claim 1, wherein the support ring is configured to substantially prevent the elastic ring from directly contacting the sealing ring in a region where the elastic ring applies pressure to the sealing ring via the support ring.

6. A hinge of a track comprising:
   a pin,
   an outer track link attached to the pin,
   a bushing rotatably supported on the pin,
   an inner track link attached to the bushing, wherein an oil lubrication chamber is defined at least in part by the pin, the bushing and a sealing assembly comprising:
   a sealing ring having an annular sealing edge sealingly abutting on a radially-extending end surface of the bushing, an elastic ring abutting on the inner track link and urging the sealing ring in an axial direction towards the bushing, the elastic ring having an axially-projecting, hollow cylinder-shaped sealing lip that projects towards the bushing, and
   wherein at least one axially-extending outer surface of the sealing ring engages the support ring to create a first engagement, and
   wherein at least one notch defined in a radially-inwardly extending region of an axial end of the support ring that faces away from the end surface of the first portion and the sealing ring has at least one corresponding axially-projecting, sector-like bulge configured to engage in the notch of the support ring to create a second engagement, and
   wherein rotation of the support ring relative to the sealing ring is prevented by the combination of both the first and second engagements.

7. A hinge according to according to claim 6, further comprising a spacer ring disposed between the pin and the sealing ring.

8. A hinge according to claim 7, wherein the sealing ring has a substantially L-shaped longitudinal cross-section and the support ring has a substantially S-shaped longitudinal cross-section.

9. A hinge according to claim 7, wherein an annular bulge projects radially outward from a radially outer surface of the elastic ring, the annular bulge also projecting obliquely towards the radially-extending end surface of the bushing and engaging the outer track link.

10. A hinge according to claim 7, wherein the support ring is configured to substantially prevent the elastic ring from directly contacting the sealing ring in a region where the elastic ring urges the sealing ring via the support ring.

11. A hinge of a track having a sealed oil lubrication chamber at least partially defined by a pin, a bushing rotatably supported on the pin and a seal, the seal comprising:
    a sealing ring having substantially an L-shape and including an annular-extending sealing edge sealingly abutting on a radially-extending end surface of the bushing,
    an elastic ring urging the sealing ring in an axial direction towards the bushing, the elastic ring having an axially-projecting, hollow cylinder-shaped sealing lip that projects towards the bushing, and
    a support ring disposed between the sealing ring and the elastic ring, and
    wherein at least one axially-extending outer surface of the sealing ring engages the support ring to create a first engagement, and
    wherein at least one notch defined in a radially-inwardly extending region of an axial end of the support ring that faces away from the end surface of the first portion and the sealing ring has at least one corresponding axially-projecting, sector-like bulge configured to engage in the notch of the support ring to create a second engagement, and wherein rotation of the support ring relative to the sealing ring is prevented by the combination of both the first and second engagements.

12. A hinge according to according to claim 11, further comprising a spacer ring disposed between the pin and the sealing ring and wherein the support ring has a substantially S-shaped longitudinal cross-section.

13. A hinge according to claim 11, wherein an annular bulge projects radially outward from a radially outer surface of the elastic ring, the annular bulge also projecting obliquely in the direction of the radially-extending end surface of the bushing.

14. A hinge according to claim 13, further comprising an outer track link attached to the pin, an inner track link attached to the bushing and a spacer ring disposed between the pin and the sealing ring, wherein the elastic ring permanently abuts on the outer track link and the annular bulge of the elastic ring engages in a correspondingly-shaped recess defined in the outer track link, and wherein a plurality of axially-extending, circumferentially-distributed projections extend from an outer surface of the sealing ring and engage the support ring, the engagement of the projections in the support ring preventing rotation of the support ring relative to the sealing ring.

* * * * *